United States Patent [19]

Sims

[11] Patent Number: 4,591,706

[45] Date of Patent: May 27, 1986

[54] PHOTODETECTOR

[76] Inventor: George E. Sims, 10 Bramble Close, Harpenden, Hertfordshire, A15 4AN, England

[21] Appl. No.: 635,454

[22] Filed: Jul. 30, 1984

[30] Foreign Application Priority Data

Aug. 8, 1983 [GB] United Kingdom ................ 8321294

[51] Int. Cl.⁴ ............................................. G06K 7/10
[52] U.S. Cl. .................................... 235/454; 235/472
[58] Field of Search .................... 235/454, 472; 357/19

[56] References Cited

U.S. PATENT DOCUMENTS 4,376,483 1/1983 Takahisha ............................. 357/19

Primary Examiner—Harold I. Pitts

[57] ABSTRACT

A photodetector and light source assembly useful in a bar-code reading system comprises a semiconductor substrate with holes therein. A light source form of LED's mounted on one side of the substrate corresponding with the respective holes illuminates an object plane, via a lens system, on the other side of the substrate. Preferably, the light received by the photodetector is slightly out of focus. Advantages include a saving in cost and size together with an improved depth of field and efficiency of illumination.

14 Claims, 2 Drawing Figures

PHOTODETECTOR

The present invention relates to photodetectors and more particularly to photodetectors made from semiconductors, such as a silicon photodetector. A principal, but not exclusive use of the invention, is in the field of bar-code reading wherein a reflective sensor system (employing, for example, a silicon photodetector, a light source and a lens system) is used to read bar-codes normally printed on labels.

In bar-code reading systems, it is necessary to illuminate a small spot in a bar-code scanning region so that sufficient light is reflected (from the bar-code) onto a photodetector which thereby generates a corresponding signal. Ideally, the photodetector receives all of the light reflected from the illuminated spot and there is no waste of illuminating power. Moreover, due to the nature of bar-code readers, the optical system should be small and relatively simple in construction.

One known method of producing a reflective sensor system for bar-code reading is to utilise a fibre optic lead with one end split randomly into two ferrules. However, with such a fibre optic system, most of the light generated is wasted or lost before it enters the fibre optics and some light is lost in transmission. A high level of illumination is thereby required which reduces the efficiency of the system. Moreover, a fibre optic system has further disadvantages with regard to cost and size.

An alternative approach is to mount a light emitting diode (LED) and a photodetector side by side. A lens system is used to focus the incident light onto the bar-code scanning region and to focus the reflected light onto the photodetector. However, such an arrangement has the disadvantage of providing a very limited depth of focus due to the separation between the light source and photodetector. For example, the depth of focus of the lens is inversely proportional to its diameter and directly proportional to its focal length. Attempts to improve the depth of focus by stopping down the lens system clearly reduces the level of illumination of the object and hence severely decreases the efficiency of illumination. With more general regard to systems employing a photodetector spaced from a light source, there is only one arrangement, i.e. with regard to the relative positions of the light source, photodetector and object plane, in which all of the incident light falling on the object plane is reflected onto the photodetector (the object plane is normally arranged at the point of intersection of the incident and reflected light beams).

Whilst other optical arrangements employing, for example, half-silvered mirrors, may be used to reduce or to overcome these problems, such arrangements are too cumbersome to be of any practical value in a bar-code reading system.

The present invention seeks to overcome the abovementioned problems and to provide a photodetector which may be used, for example, to provide an improved bar-code reading system.

The invention provides a photodetector made from semiconductor material, said material being in the form of an apertured body or substrate to enable a light source to be mounted on one side thereof for illuminating the other side via the aperture or apertures.

In a preferred embodiment, a semiconductor substrate has one or more holes therethrough. For example, three holes may be arranged at the apices of a triangle within the peripheral boundary of, e.g. a circular, disc-shaped substrate. However, it may also be feasible to provide apertures in the form of notches, slots or sector-shaped recesses around the periphery of a substrate. Such recesses may be provided separately from, or in addition to through holes. Holes which pass through the semiconductor substrate are preferred to avoid edge effects, such as optical diffusion. Since it is not normally practical to drill holes, for example, in crystalline silicon, the apertures are preferably formed during the process of manufacturing the semiconductor device. For example, holes may be formed by etching an amorphous silicon substrate.

Preferably, the light source is provided by one or more LED's which are arranged behind each respective aperture on the same chip. Suitably, the light source, such as LED's, is selected with regard to the optical response of the photodetector to maximise the response of the system. For example, the photodetector and the LED's are preferably types which respectively respond and reproduce light which is biased into the visible portion of the spectrum.

The size of the holes may be adjusted in order to vary the amount of light passing through the semiconductor body of substrate. The number of holes (and LED's) may also be varied to suit particular requirements.

Besides saving costs in manufacture and reducing the size of the system due to mounting LED's on the same substrate as a photodetector, the invention enables an optical system to be constructed, for example, for use in a bar-code reading system, which has a better depth of focus and a better efficiency of illumination than the known systems described above. In arrangements according to the invention, the light source is closer to the optical axis of the photodetector hence effectively reducing the diameter of the lens system required to focus light onto an object plane.

In a preferred arrangement wherein a bar-code reader employs a photodetector and a light source assembly according to the invention, together with a lens system for focusing light onto an object plane, the arrangement is such that the light received by the sensitive side of the photodetector is slightly blurred or out of focus. This is due to factors such as (a) the light souce (LED's) not being in the same plane as the sensitive side of the photodetector and the relative locations of the lens system and the photodetector, (b) variations, which are experienced in practice, in the distance between the reflective system (bar-code) and the lens system, and (c) the nature of the lens system, for example, its optical aberrations. Such a "slightly out of focus" system is advantageous in a bar-code reader in that the reflected light is spread over the whole are of the sensitive side of the photodetector and a good depth of field is available for accommodating variations in the distance between the bar-code and the lens system.

BRIEF DESCRIPTION OF DRAWINGS

An example of the invention is described with reference to the accompanying schematic drawings, in which.

DESCRIPTION OF THE PREFERRED EMBODIMENTS

Figure 1:
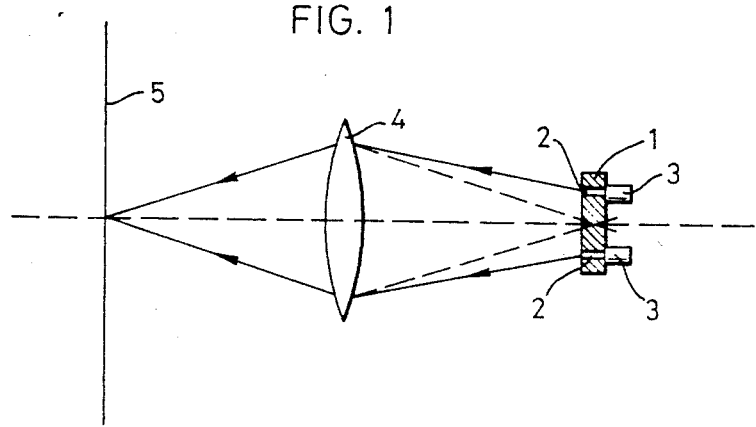
FIG. 1 illustrates an optical arrangement including a photodetector in accordance with the invention.
Figure 2:
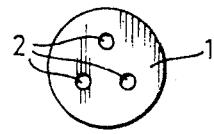
FIG. 2 is an elevation of the photodetector used in the arrangement of FIG. 1.

Referring to the drawings, a silicon photodetector, in the form of a circular substrate, has three holes 2 therethrough. The holes are located at the apices of an equilateral triangle which is centered on the circular disc or substrate 1. As shown in FIG. 2, three LED's 3 are mounted on one side of the circular substrate 1 in correspondence with the respective holes 2. The LED's may be mounted on the photodetector by any suitable means, e.g. they may be bonded to the substrate 1. The photodetector is located at or adjacent the focus of a lens system 4 which is arranged to focus the light passing through the holes 2 onto a focal plane 5 corresponding with, for example, a bar-code scanning region.

The light (from LED's 3) which passes through the holes 2 is focused onto plane 5 and is reflected therefrom back through the lens system 4 onto the photodetector (i.e. onto a light responsive face of the substrate on the opposite side to the face on which the LED's 3 are mounted). The incident and reflected light follows closely adjacent paths, close to the optical axis, whereby the illumination of the light sensitive face of the photodetector is improved (e.g. compared with the prior art arrangement wherein LED's are arranged side-by-side with a photodetector). The relative positions of the lens 4 and the photodetector are adjusted for the best or required level of illumination.

It will be understood that the above-mentioned arrangement has been described by way of example only since variations and changes may be made by a person skilled in the art without departing from teh scope and spirit of the invention as defined by the appended claims.

I claim:

1. A photodetector made from semiconductor material, said material being in the form of an apertured body or substrate to enable a light source to be mounted on one side thereof for illuminating the other side via the aperture or apertures.

2. A photodetector according to claim 1, wherein the aperture or apertures are in the form of a through hole or holes in said body or substrate.

3. A photodetector according to claim 2, wherein said holes are located at the apices of a triangle centered on said body or substrate.

4. A photodetector according to claim 1, wherein said apertured body or substrate is formed by etching an amorphous silicon substrate.

5. A photodetector and light source assembly comprising a photodetector made from semiconductor material, said material being in the form of an apertured body or substrate, and a light source mounted on one side of said body or substrate for illuminating the other side via the aperture or apertures.

6. A photodetector and light source assembly according to claim 4, wherein the aperture or apertures are in the form of a through hole or holes in said body or substrate.

7. A photodetector and light source assembly according to claim 5, wherein said holes are located at the apices of a triangle centered on said body or substrate.

8. A photodetector and light source assembly according to claim 5, wherein said apertured body or substrate is formed by etching an amorphous silicon substrate.

9. A photodetector and light source assembly according to claim 5, wherein said light source is in the form of one or more light emitting diodes bonded to said body or substrate.

10. A bar-code reader comprising a photodetector made from semiconductor material, said material being in the form of an apertured body or substrate, a light source mounted on one side of said body or substrate for illuminating the other side via the aperture or apertures, and a lens system for focusing light from said light source onto a focal plane and for returning reflected light to the photodetector.

11. A bar-code reader according to claim 10, wherein the aperture or apertures are in the form of a through hole or holes in said body or substrate.

12. A bar-code reader according to claim 11, wherein said holes are located at the apices of a triangle centered on said body or substrate.

13. A bar-code reader according to claim 10, wherein said light source is in the form of one or more light emitting diodes bonded to said body or substrate.

14. A bar-code reader according to claim 10, wherein said apertured body or substrate is formed by etching an amorphous silicon substrate.

* * * * *

UNITED STATES PATENT AND TRADEMARK OFFICE
CERTIFICATE OF CORRECTION

PATENT NO. : 4,591,706
DATED : May 27, 1986
INVENTOR(S) : George Edward Sims

It is certified that error appears in the above-identified patent and that said Letters Patent is hereby corrected as shown below:

Cover page, block (73) should read as follows:

--Assignee:  S.B. Electronic Systems Limited
             Harpenden, Hertfordshire, England--;

Column 1, before line 4, insert

--BACKGROUND OF THE INVENTION

1.  Field of the Invention--;

Column 1, before line 12 insert

--2.  Description of the Related Art--;

Column 1, before line 61 insert

--SUMMARY OF THE INVENTION--; and

Column 3, line 29, delete "teh" and insert --the--.

Signed and Sealed this

Thirteenth Day of October, 1987

Attest:

DONALD J. QUIGG

*Attesting Officer*       *Commissioner of Patents and Trademarks*